United States Patent
Erickson et al.

(10) Patent No.: US 8,316,875 B2
(45) Date of Patent: *Nov. 27, 2012

(54) METHODS, APPARATUS AND/OR SYSTEMS RELATING TO FUEL DELIVERY SYSTEMS FOR INDUSTRIAL MACHINERY

(75) Inventors: Dean M. Erickson, Simpsonville, SC (US); David W. Smith, Simpsonville, SC (US); Douglas S. Byrd, Greer, SC (US); Hua Zhang, Greer, SC (US); Daniel B. Holcombe, Greenville, SC (US)

(73) Assignee: General Electric Company, Schenectady, NY (US)

( * ) Notice: Subject to any disclaimer, the term of this patent is extended or adjusted under 35 U.S.C. 154(b) by 988 days.

This patent is subject to a terminal disclaimer.

(21) Appl. No.: 12/345,721

(22) Filed: Dec. 30, 2008

(65) Prior Publication Data

US 2010/0162708 A1    Jul. 1, 2010

(51) Int. Cl.
*G05D 11/00* (2006.01)
*B01F 5/04* (2006.01)
*E03B 1/00* (2006.01)
*F16K 11/02* (2006.01)

(52) U.S. Cl. .................. 137/111; 137/896; 137/605
(58) Field of Classification Search .................. 137/111, 137/896, 605, 897, 606; 165/155; 239/407, 239/410
See application file for complete search history.

(56) References Cited

U.S. PATENT DOCUMENTS

| | | | | |
|---|---|---|---|---|
| 3,685,740 A * | 8/1972 | Shepherd | ...................... | 239/400 |
| 4,334,854 A * | 6/1982 | Graat et al. | ...................... | 431/8 |
| 4,666,463 A * | 5/1987 | Stellaccio | ................... | 48/197 R |
| 6,918,255 B2 | 7/2005 | Kaplan et al. | | |
| 7,117,675 B2 | 10/2006 | Kaplan et al. | | |
| 7,527,068 B2 * | 5/2009 | Jansen | ........................ | 137/340 |

FOREIGN PATENT DOCUMENTS

| | | |
|---|---|---|
| EP | 1965054 A2 | 9/2008 |
| GB | 2262776 | 6/1993 |
| JP | 60022067 | 2/1985 |
| JP | 05248266 | 9/1993 |
| JP | 06094218 | 4/1994 |
| JP | 07332114 | 12/1995 |

OTHER PUBLICATIONS

European Patent Office Search Report.

* cited by examiner

*Primary Examiner* — Dinh Q Nguyen
*Assistant Examiner* — Chee-Chong Lee
(74) *Attorney, Agent, or Firm* — Mark E. Henderson; Ernest G. Cusick; Frank A. Landgraff

(57) ABSTRACT

An assembly for delivering a supply of liquid fuel and a supply of purge air to a gas turbine engine, the assembly comprising: an annular dual-flow check valve for controlling the flow through concentric channels that have a common outlet, the annular dual-flow check valve comprising: an outer body and an inner body that define the concentric channels, which include an outer channel and an inner channel formed therein; a spring activated annular poppet that resides in the outer channel and has a range of motion in the axial direction; and an opening through the inner body that connects the outer channel to the inner channel; wherein the axial movement of the annular poppet is regulated by the pressure of the flow upstream of the annular poppet in the outer channel; and the axial range of motion of the annular poppet includes at least two axial positions.

25 Claims, 5 Drawing Sheets

METHODS, APPARATUS AND/OR SYSTEMS RELATING TO FUEL DELIVERY SYSTEMS FOR INDUSTRIAL MACHINERY

BACKGROUND OF THE INVENTION

This present application relates generally to apparatus, methods and/or systems pertaining to controlling flow through concentric hollow passages. More specifically, but not by way of limitation, the present application relates to apparatus, methods and/or systems pertaining to an annular style check valve that passively controls two independent supply flow streams to a common outlet flow stream.

In certain industrial applications, there is a need for controlling the flow of supply lines that are configured in a concentric arrangement. While certain conventional systems may be configured to functional perform this tasks, they are bulky, inefficient, expensive and/or require active control. As a result, there remains a need for improved apparatus, methods and/or systems relating to the more efficient and cost effective control of the flows through concentrically arranged supply lines.

For example, the fuel delivery system of certain gas turbine engines have an issue of residual liquid fuel coking and fouling the system. The coking of liquid fuel in fuel lines of gas turbine engines has been a long-standing issue, particularly in those dual-burn engines that bun both a liquid and gaseous fuel. Generally, when the engine is switch from burning a liquid fuel to a gaseous fuel, a residual of the liquid fuel remains in the liquid fuel piping system. Conventional systems generally do not have the capability to remove all of the residual liquid fuel from the pipes within the system and some of the residual remains in pipes that reside near the endcover of the combustor unit and, as a result, experience the elevated temperatures associated with the combustion process. When the liquid fuel is moving through the supply lines, the elevated temperatures do not have time to coke the fuel. However, because the residual liquid fuel is stationary, the elevated temperatures, over time, coke the fuel. As one of ordinary skill will appreciate, this process makes the residual liquid fuel turn gummy or solid, which generally results in significant operational issues and/or an inability of the engine to properly burn the liquid fuel.

Conventional systems have failed to adequately address these issues in a cost-effective and efficient manner. For example, some conventional systems employ remote actuated 2-way and 3-way valve configurations as a replacement for standard check valves. However, these systems proved costly to implement and still do not fully address the coking issue. Efforts to cool the residual liquid fuel have included water-cooled check valves and air-cooled 2-way valves. However, these designs and the associated components generally are costly, result in increased maintenance, and may result in operability risks if not properly installed and maintained. As a result, there is a need for systems and methods that adequately address the coking issue in a cost-effective and efficient manner.

BRIEF DESCRIPTION OF THE INVENTION

The present application thus describes an assembly for delivering a supply of liquid fuel and a supply of purge air to a gas turbine engine, the assembly comprising: an annular dual-flow check valve for controlling the flow through concentric channels that have a common outlet, the annular dual-flow check valve comprising: an outer body and an inner body that define the concentric channels, which include an outer channel and an inner channel formed therein; a spring activated annular poppet that resides in the outer channel and has a range of motion in the axial direction; and an opening through the inner body that connects the outer channel to the inner channel; wherein the axial movement of the annular poppet is regulated by the pressure of the flow upstream of the annular poppet in the outer channel; and the axial range of motion of the annular poppet includes at least two axial positions: a closed position where the annular poppet substantially covers the opening and a open position where at least a portion of the opening is not covered by the annular poppet; a first valve that is located upstream of the annular dual-flow check valve and configured to control a flow of purge air entering the outer channel; and a second valve that is located upstream of the annular dual-flow check valve and configured to control a flow of liquid fuel entering the inner channel.

A method of delivering a supply of liquid fuel and a supply of purge air to a common supply line of a combustor of a gas turbine engine that burns liquid fuel and gas fuel, the method comprising the steps of: a) configuring a fuel delivery assembly that includes: an annular dual-flow check valve for controlling the flow through concentric channels that have a common outlet, the annular dual-flow check valve comprising: an outer body and an inner body that define the concentric channels, which include an outer channel and an inner channel formed therein; a spring activated annular poppet that resides in the outer channel and has a range of motion in the axial direction; and an opening through the inner body that connects the outer channel to the inner channel; wherein the axial movement of the annular poppet is regulated by the pressure of the flow upstream of the annular poppet in the outer channel; and the axial range of motion of the annular poppet includes at least two axial positions: a closed position where the annular poppet substantially covers the opening and a open position where at least a portion of the opening is not covered by the annular poppet; a first valve that is located upstream of the annular dual-flow check valve and configured to control a flow of purge air entering the outer channel; and a second valve that is located upstream of the annular dual-flow check valve and configured to control a flow of liquid fuel entering the inner channel; b) when the combustor is burning liquid fuel, setting the first valve to a closed position such that substantially no purge air flows to the outer channel and the annular poppet remains in the closed position, and setting the second valve to a open position such that liquid fuel flows through the inner channel of the annular dual-flow check valve and is delivered to the common supply line; and c) when the combustor is burning gas fuel, setting the second valve to a closed position such that substantially no liquid fuel flows to the inner channel, and setting the first valve to an open position such that purge air flows to the outer channel, displaces the annular poppet to the open position, flows through the opening and is delivered to the common supply line.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
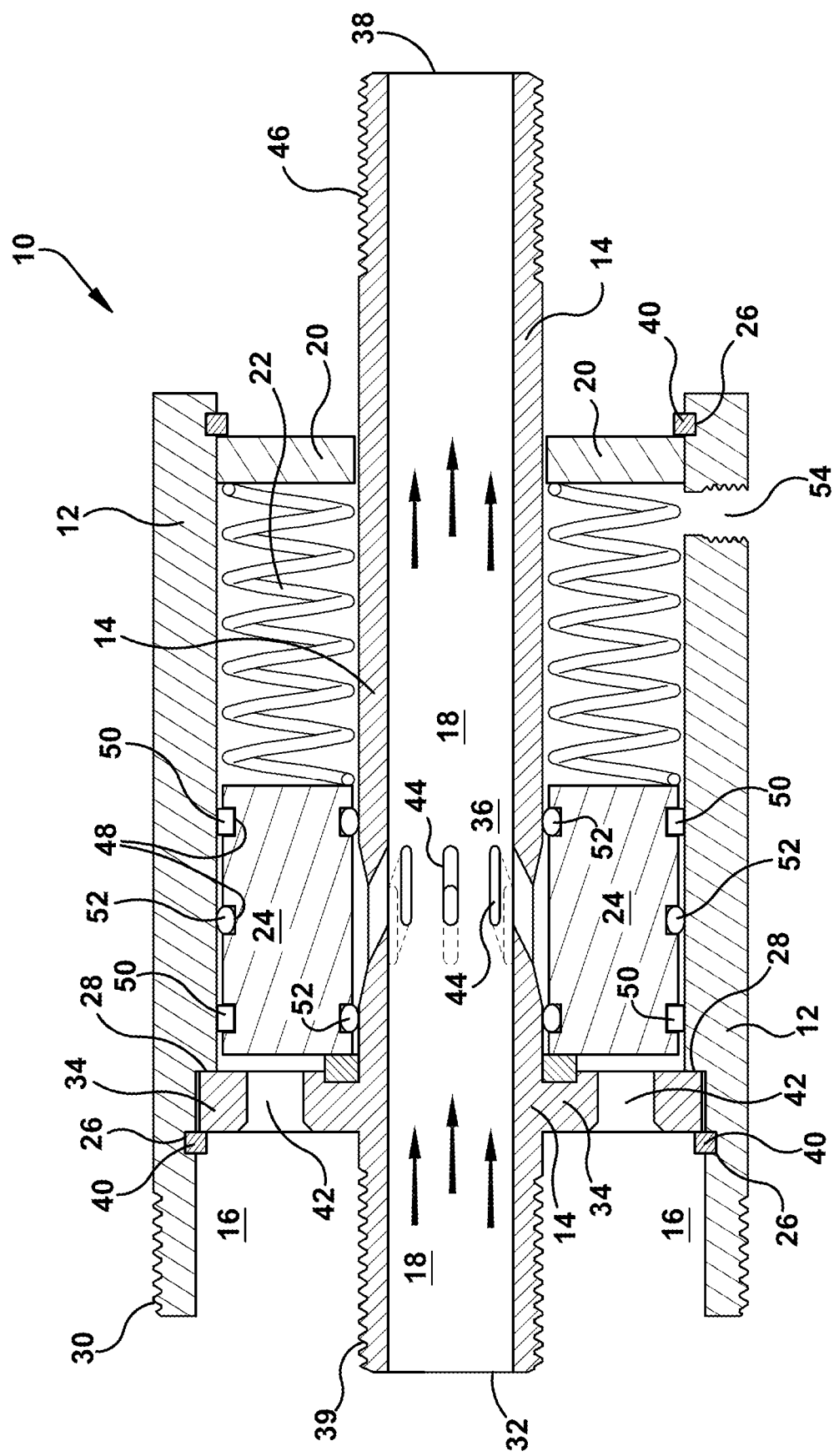
FIG. 1 is a cross-section of a annular dual-flow check valve in accordance with an exemplary embodiment of the present application.

Referring now to the figures, FIG. 1 illustrates a section view of an annular dual-flow check valve 10 according to an exemplary embodiment of the present invention. As illustrated, the annular dual-flow check valve 10 may include an outer body 12 and an inner body 14 that define concentric flow channels, an outer channel 16 and an inner channel 18. The annular dual-flow check valve 10 further may include an assembly end-cap or end-cap 20, a spring 22, and an annular check poppet or annular poppet 24, which will be discussed in more detail below.

The outer body 12 generally forms a hollow chamber that is substantially cylindrical in shape and which forms the outer boundary of the outer channel 16. The inner wall of the outer body 12 may have grooves 26 or steps 28 formed therein, which, as discussed in more detail below, may be used to secure or fix the axial position of other components within the outer body 12, though, as one of ordinary skill in the art will appreciate, other conventional methods or mechanical connections may also be used. The upstream end of the outer body 12 may be formed with a connecting means, such as, for example, a threaded outer surface 30, which, as shown, may be used to connect the outer body 12 to another pipe. Other means of attachment also may be used. Note that, given the depiction of the annular dual-flow check valve 10 in FIG. 1, the flow through it, in operation, will move in a general left to right direction. The relative positioning of components may be described with an "upstream" or "downstream" designation. Accordingly, components on the left side may be referred to as being on the "upstream" side while components on the right side may be referred to as being on the "downstream" side. It will be appreciated that this description relates to the direction of flow through the annular dual-flow check valve 10. In addition, the annular dual-flow check valve 10 may be used to channel flows of gases or liquids, or a combination of a flow of liquids and a flow of gas.

The inner body 14 generally forms a hollow chamber that is cylindrical in shape. The outer surface of the inner body 14 generally forms the inner boundary of the outer channel 16 and the inner surface of the inner body 14 generally forms the outer boundary of the inner channel 18. The inner body 14 is sized and configured such that it may be inserted within the outer body 12. (Note that the preferred embodiment of FIG. 1 is described as comprising an assembly of separate parts. This is exemplary only. As one of ordinary skill in the art will appreciate, the outer body 12 could be constructed such that it is integral to the inner body 14 and/or to some of the other parts described.) Generally, moving from the upstream end to the downstream end, the inner body 14 may include an inlet 32, a flange 34, a mid-body 36, and an outlet 38, all of which have the inner channel 18 defined therethrough. (Note that the description of these several parts of the inner body 14 is done for the convenience of clear description and not intended to be limiting in any way.) The inlet 32 generally forms the inlet to the inner channel 18 that extends through the inner body 14, and comprises a relatively thin sleeve or wall that defines a hollow cylindrical passageway. The inlet 32 may extend upstream a desired distance and, as shown, may terminate with a connecting means, such as, for example, an outer threaded surface 39, which may be used to connect to another pipe or hollow passageway, as illustrated.

The flange 34 extends radially outward from the inner body 14 and makes a connection with the outer body 14 that substantially secures or fixes the axial position of the inner body 14 within the outer body 12. For example, as shown, the flange 34 may have a diameter that is greater than the diameter at a narrow point or circumferential step 28 formed in the inner wall of the outer body 12. Thereby, the step 28 may restrict the axial movement of the flange 34 (and thus the inner body 14) in one axial direction (as shown, the step restricts the movement of the flange 34 in the downstream direction). A groove 26 may be positioned just upstream of the upstream end of the flange 34, and an insert 40 then may be used to engage the groove 26 and narrow the diameter of the outer channel 16, similar in function to the step 28. Thereby, as illustrated, the groove 26/insert 40 assembly may restrict movement of the flange 34 (and thus the inner body 14) in the upstream direction. That is, the insert 40 may extend radially inward such that it prevents the flange 34 from moving upstream. As one of ordinary skill in the art will appreciate, other mechanical connections or configurations may be used to restrict the axial movement of the flange 34/inner body 14. Within the flange 34, several flange channels 42 may be formed. The flange channels 42 may provide an axially oriented channel or opening through the flange 34 such that the flow through the outer channel 16 may pass through the flange 34, i.e., the flange 34 does not block the flow through the outer channel 16. The flange channels 42 may be sized and configured depending on desired performance.

The mid-body 36 of the inner body 14 generally may extend axially from the flange 34 in a downstream direction. The mid-body 36 may include a relatively thin sleeve or wall that defines a hollow cylindrical passageway. Within the mid-body 36, multiple passageways or apertures may be formed through the sleeve or wall that defines the inner channel 18. As shown in FIG. 1, these passageways or apertures may comprise slots 44 in certain preferred embodiments. In general, the slots 44 form openings between the outer channel 16 and the inner channel 18 such that the outer channel 16 is in fluid communication with the inner channel 18. As illustrated in the embodiment of FIG. 1, the slots 44 may be axially oriented elongated openings. As stated, openings of other shapes also may be used, such as, for example, multiple circular apertures or holes. As explained in more detail below, the axial location of the slots 44 generally will coincide with the axial location of the annular poppet 24 and its range of motion.

The outlet 38 generally forms the outlet of the inner channel 18 that extends through the inner body 14. The outlet 38 generally extends downstream a desired distance from the mid-body 36 and, as shown, may terminate after a relatively short distance with a connecting means, such as, for example, a threaded outer surface 46. The threaded outer surface 46 of the outlet 38 may be used to connect the inner body 14 to a pipe or other fitting so that the inner channel 18 continues downstream.

The end-cap 20 may be formed at the downstream end of the outer body 12. The end-cap 20 generally provides a stationary or fixed surface against which on end of the spring 22 may rest and, to fulfill this function, may be of several different designs, sizes and configurations. As shown, the end-cap 20 is circular in shape with a middle hole or passage through which the inner body may pass. The end-cap 20 may be held in place by a groove 26/insert 40 assembly, though other mechanical connections may be used to secure the axial position of the end-cap 20.

As described, one end of the spring 22 may rest against the end-cap 20. The other end of the spring 22 may rest against the annular poppet 24. The spring 22 may be a conventional spring or equivalent mechanical device that generally circumscribes the inner body 14. As shown, the annular poppet 24 is a dough-nut shaped piece that is generally free to move axially against the spring 22 as the pressure of the flow through the outer channel 16 dictates. Further, the annular poppet 24 generally provides a solid piece that extends between the inner surface of the outer body 12 and the outer surface of the inner body 14. The inner body 14 and the inner channel 18 may extend through the hollow opening in the center of the annular poppet 24. The annular poppet 24 also may have several poppet grooves 48 cut into its inner and outer surfaces where guides 50 and/or o-rings 52 may be located. The guides 50 may be comprised of teflon or other suitable material and, as one of ordinary skill in the art will appreciate, may operate to assist the movement of the annular poppet 24. The o-rings 52 be made of any suitable material, and, as one of ordinary skill in the art will appreciate, may function to seal the annular poppet 24 such that axial flow around the poppet 24 is substantially prevented.

The end-cap 20, the spring 22, and the annular poppet 24 may be configured within the outer body 12 and around the inner body 14 such that: 1) when the spring 22 is not compressed, the poppet 24 resides in an axial position that covers the slots 44 (thus preventing flow from the outer channel 16 to the inner channel 14 through the slots 44); and 2) when the spring is compressed, the poppet 24 resides downstream of the slots 44 such that one or more of the slots 44 are uncovered (thus allowing flow from the outer channel 16 to the inner channel 14 through the slots 44). A drain 54 may be located upstream of the end-cap 20. The drain 54 may comprise an aperture or hole through the outer body 12 that provides an outlet for any fluids or gases that enter the outer channel 16 downstream of the poppet 24.

The annular dual-flow check valve 10 assembly that is described above is configured such that it may be constructed and assembled in a cost-effective and efficient matter. For example, the end-cap 20 may be inserted into the outer body 12 through the upstream end and slid downstream until its axial movement is checked by a groove 26/insert 40 assembly that is positioned near the downstream end of the outer body 14. The spring 22 may then be inserted into the outer body 16 until it rests against the end-cap 20. Then, the annular poppet 24 may be inserted into the outer body 16 until it rests against the spring 22. The inner body 14 then may be inserted until the flange 34 rests against the step 28. The flange 34 then may be bracketed between the step 28 and another groove 26/insert 40 assembly positioned upstream of it, thereby securing the axial position of the inner body 14 within the outer body 12. This generally completes the assembly of the annular dual-flow check valve 10 in accordance with an exemplary embodiment of the present invention. As one of ordinary skill there will appreciate, the specifics of the several mechanical connections may be varied without departing from the general design that allows such a convenient assembly.

In use, the annular dual-flow check valve 10 may operate as follows. As illustrated in FIG. 1, the pressure of the flow into the outer channel 18 may be insufficient to move the annular poppet 24 against the spring 22, i.e., the flow may be insufficient to depress the spring 22. In this case, the annular poppet 24 resides in a "closed position." In the closed position, the annular poppet 24 may reside in substantially the same axial position as the slots 44, thereby covering the slots 44. Flow through the inner channel 18 may take place, but flow from the outer channel 16 to the inner channel 18 and from the inner channel 18 to the outer channel 16 is substantially blocked by the annular poppet 24. As one of ordinary skill in the art will appreciate, such flow may be more completely blocked by the poppet 24 with the usage of the o-rings 52 that are positioned on either side of the slots 44, i.e., the upstream side and the downstream side of the slot 44. It will be appreciated that some flow may occur from the inner channel 18 through the slots 44 and provide pressure against the poppet 24. However, the pressure of the flow through the slot 44 and against the poppet 24 is not oriented in a direction that engages or moves the poppet 24 against the spring 22. Thus, the poppet 24 remains in a position to cover the slots 44 and prevents or substantially prevents flow from the inner channel 18 to the outer channel 16. Again, the usage of the o-rings 52 may more completely block any such flow.

Figure 2:
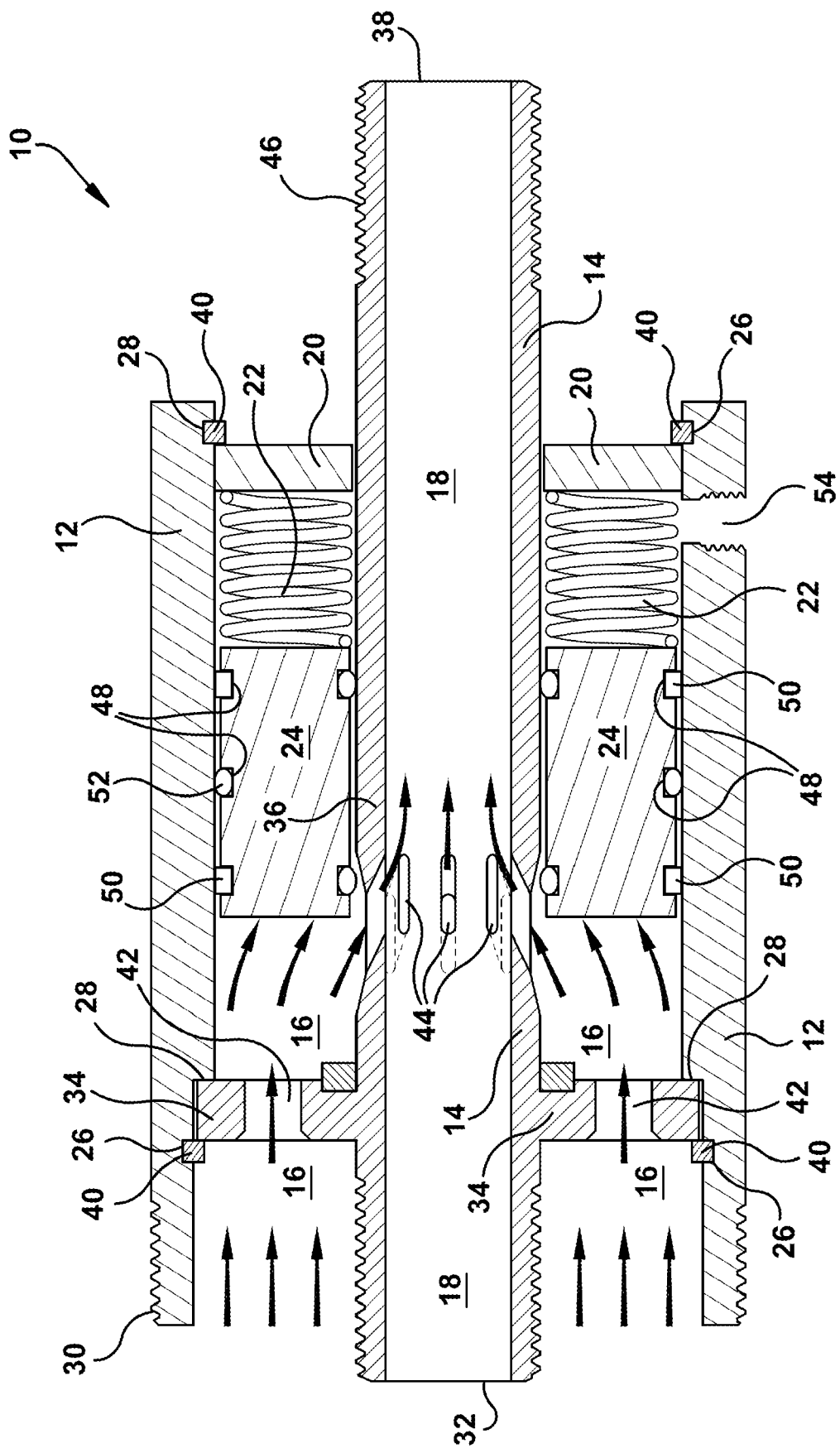
FIG. 2 is another cross-sectional view of the annular dual-flow check valve of FIG. 1.

Alternatively, as illustrated in FIG. 2, a pressurized flow into the outer channel 16 may apply sufficient pressure against the annular poppet 24 such that the poppet 24 depresses the spring 22 and, thereby, moves axially in a downstream direction. When the annular poppet 24 has moved in the downstream direction such that the slots 44 are at least partially uncovered, the poppet 24 may be described as residing in an "open position." In the open position, the gas or liquid from the outer channel 16 may flow into the inner channel 18 via the slots 44. An upstream valve (not shown) in the inner channel 18 may stop the flow to the inlet 32 of the inner body 14. In this case, the flow from the outer channel 16 through the slots 44 becomes substantially the entire flow through the inner body 14. If the flow to the inlet 32 of the inner body 14 is maintained while the poppet 24 resides in the open position, the flow through the inner channel 18 and the outer channel 16 may be mixed. In certain cases, this type of operation may be advantageous.

As stated, the slots 44 may be configured differently for optimum operation. As illustrated, the slots 44 generally comprise axially oriented elongated openings. In a preferred embodiment, the slots 44 may be angled in a downstream direction from their opening in the outer surface of the inner body 14. In a preferred embodiment, the axis of the slot 44 and the axis of the inner channel 18 may form an angle of between 30° and 60°. Among other advantages, this configuration may allow for enhanced and more efficient flow from the outer channel 16 to the inner channel 18. Upstream of the slot 44, as illustrated, the diameter of the outer surface of the inner body 14 may gradually narrow until the upstream end of the slots 44 is reached. Thus, the slots 44 may reside in a section that has a reduced diameter as the general diameter of the inner body 14. This gradual narrowing that occurs upstream of the slots 44 may provide for more efficient flow into the slots 44 from the outer channel 16. In addition, the gradual narrowing may allow the o-rings 52 to be incrementally or gradually loaded when the poppet 24 moves to the open position, which generally will prevent the o-rings 52 from being displaced by an immediate loading of the pressurized flow from the outer channel 16 that would occur otherwise. Downstream of the slots 44, as illustrated, the diameter of the outer surface of the inner body 14 may gradually broaden until the general diameter of the inner body 14 is obtained.

Figure 3:
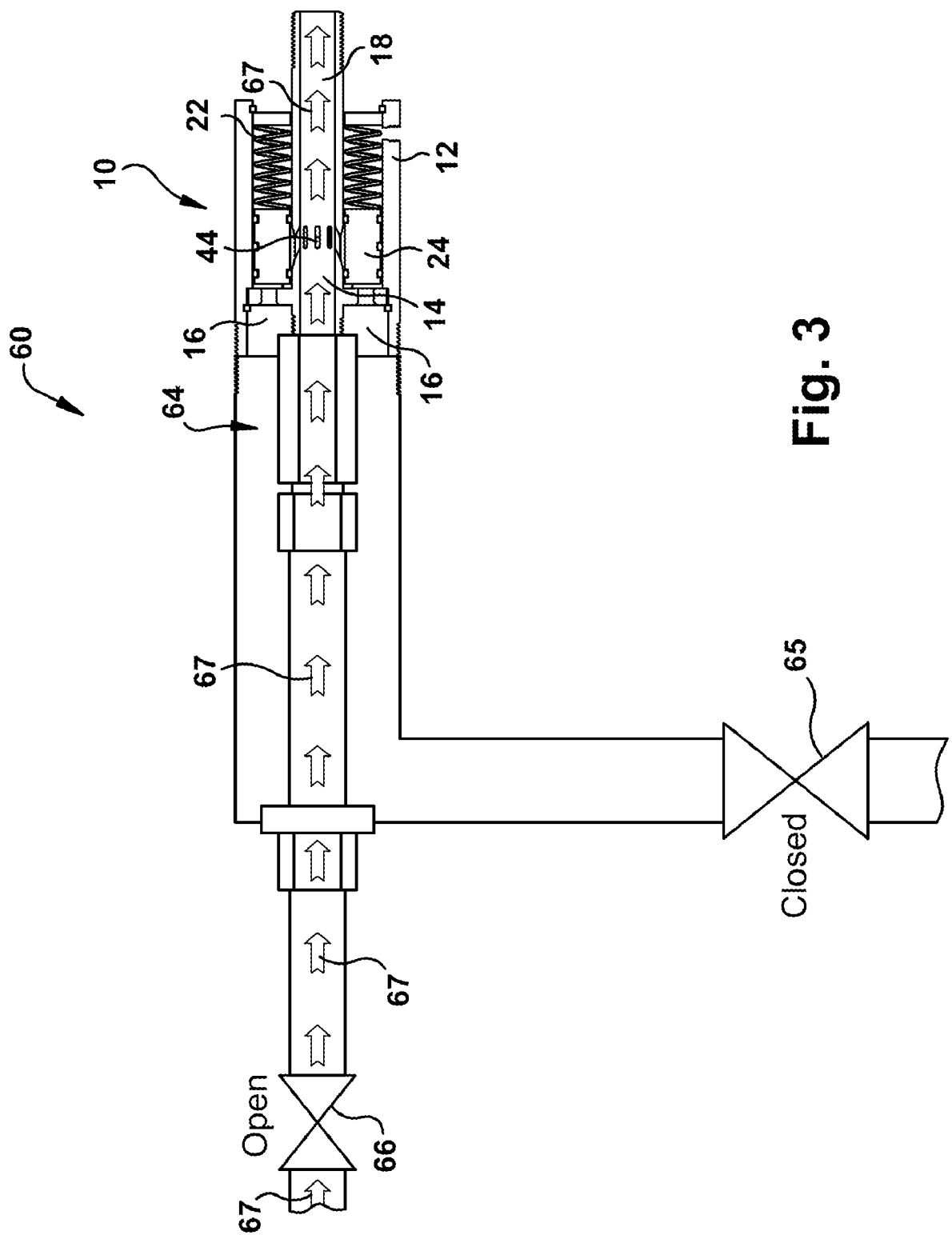
FIG. 3 is a cross-sectional view of a system employing an annular dual-flow check valve according to an exemplary embodiment of the present application.
Figure 4:
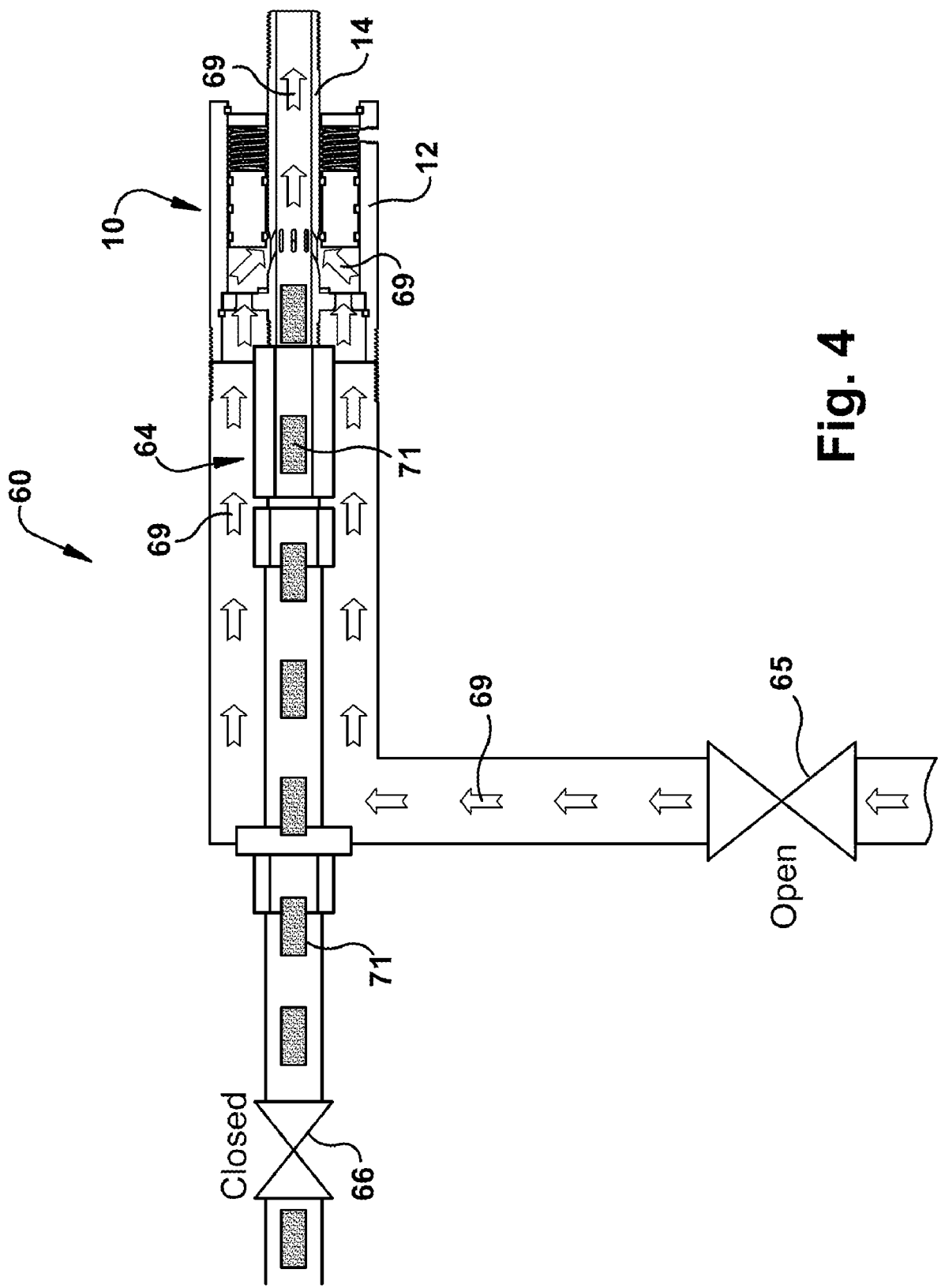
FIG. 4 is another cross-sectional view of the system of FIG. 3.
Figure 5:
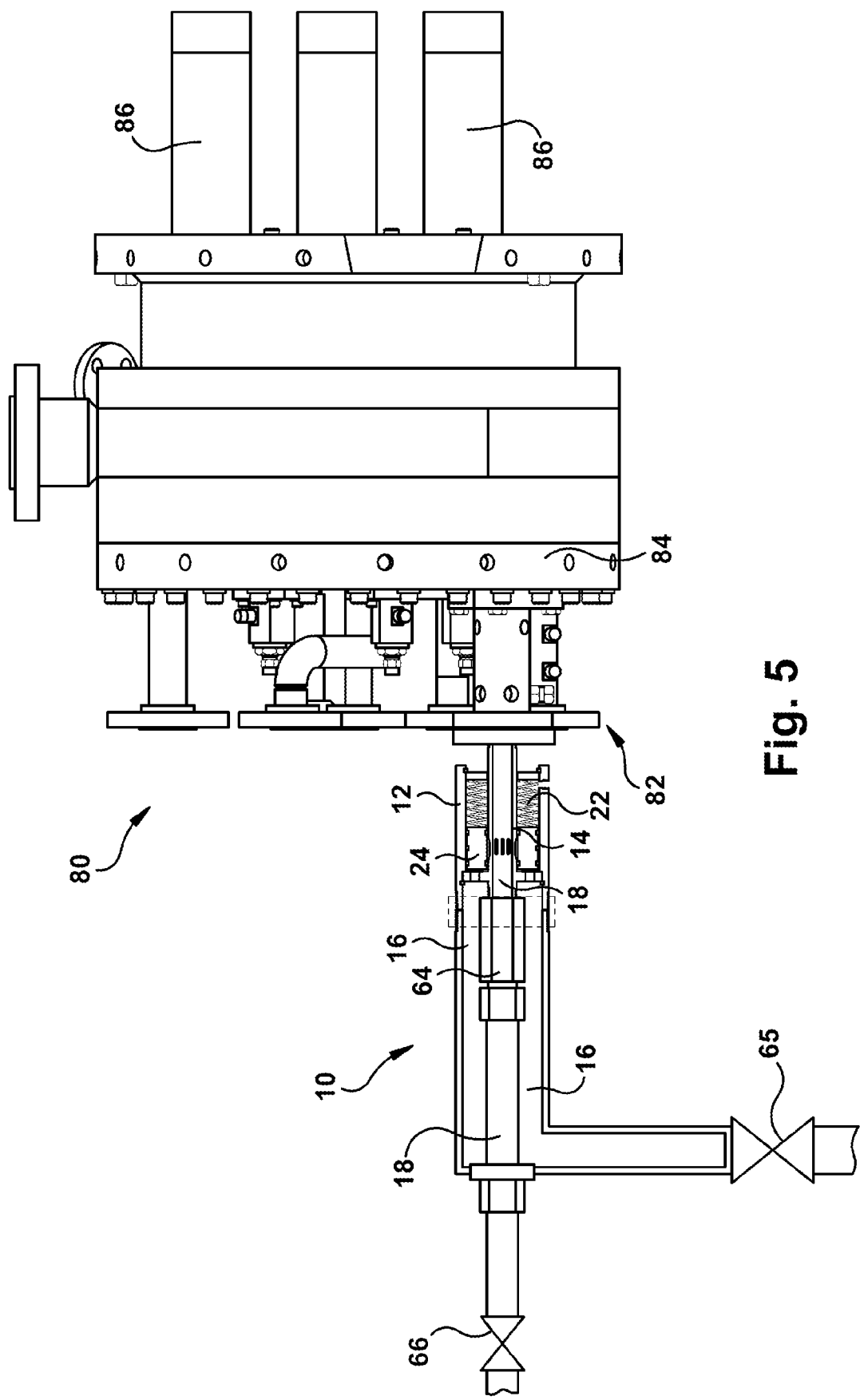
FIG. 5 is a cross-sectional view of the system of FIG. 3 as it might be used with a combustor of a gas turbine engine.

FIGS. 3, 4 and 5 illustrate an exemplary dual fluid delivery system 60 that employs an annular dual-flow check valve 10 in accordance with the present invention. FIGS. 3 and 4 illustrate a schematic cross-section of the system 60 in differing flow conditions. As illustrated, the system 60 may include an annular dual-flow check valve 10, a conventional check valve 64, an upstream extension of the outer channel 16 that includes a conventional valve 65, and an upstream extension of the inner channel 14 that includes a conventional valve 66.

The system 60 may operate as follows. In FIG. 3, it will be appreciated that the valve 65 is closed such that no flow reaches the outer channel 16 of the annular dual-flow check valve 10. With no flow, the annular poppet 24 remains in the closed position, thereby, as discussed in more detail above, covering the slots 44 and preventing flow from the outer channel 16 to the inner channel 18 and/or flow from the inner channel 18 to the outer channel 16. As indicated by arrows 67, flow may proceed through the inner channel 18 of the annular dual-flow check valve 10.

In the FIG. 4, the valve 65 may be open, thereby allowing the flow of a fluid into the outer channel 16 of the annular dual-flow check valve 10. Assuming the pressure of the flow through valve 65 is sufficient, the flow in the outer channel 16 will displace the annular poppet 24 in the downstream direction and uncover the slots 44. This, as indicated by arrows 69, will allow the flow in the outer channel 16 to travel into the inner channel 18 via the slots 44. As indicated by the blocks 71 shown, the flow through the section of the inner channel 18 upstream of the slots 44 may be halted. This may be accomplished by closing the valve 66 or through any other conventional means. With the pressure of the flow eliminated, the check valve 64 will close, thereby preventing any backflow or flow in the upstream direction from the slots 44 in the inner channel 18. While the flow condition illustrated in FIG. 4 continues, it will be appreciated that the fluid flowing through the outer channel 16 will convectively cool or heat, whatever the case may be, the stationary fluid in the inner channel 18, with the heat exchange taking place where the two channels form concentric passageways. In certain applications, this feature may be used to beneficially regulate the temperature of the flow through the inner channel 18.

As illustrated in FIG. 5, embodiments of the present invention may be employed in the fuel delivery systems of industrial machinery, such as, for example, a gas turbine engine. Further, preferred embodiments of the present invention may be used within the liquid fuel delivery and purge systems of a dual-burn gas turbine engine. As described above, the coking of liquid fuel in the fuel lines of gas turbine engines is a long-standing issue, particularly in those dual-burn engines that burn both a liquid and gaseous fuel. Generally, when the engine is switched from burning a liquid fuel to a gaseous fuel, a residual amount of the liquid fuel remains in the liquid fuel piping system. Conventional systems generally do not have the capability to remove all of the residual liquid fuel from the pipes within the system and some of the residual fuel remains in pipes that reside near to the combustor unit and, as a result, experience the elevated temperatures that occur near the combustion process. When the liquid fuel is moving through the lines, the elevated temperatures near the combustor do not have time necessary to coke the fuel. However, because the residual liquid fuel is stationary, the elevated temperatures, over time, may coke the fuel that remains in the piping system. As one of ordinary skill will appreciate, coking is highly undesirable, as it makes the residual liquid fuel turn gummy or solid, which generally results in significant operational issues and/or an inability of the engine to properly burn the liquid fuel.

As illustrated in FIG. 5, the annular dual-flow check valve 10 may be used in the fuel delivery system of a gas turbine engine. Particularly, the annular dual-flow check valve 10 may be used to deliver fuel and purge air to the combustor 80 of the gas turbine engine. At the downstream end, the outlet of the annular dual-flow check valve 10 may be connected to a liquid fuel distributor valve 82 pursuant to conventional means. As one of ordinary skill in the art will appreciate, the liquid fuel distributor valve 82 resides at the endcover 84 of the combustor 80 and may deliver a supply of liquid fuel to the combustor 80. When the gas turbine engine is switched from burning liquid fuel to a gaseous fuel, it will be appreciated that the flow of fuel to the liquid fuel distributor valve 82 will be halted. At such instances, purge air is required to purge or flush the liquid fuel from the liquid fuel distributor valve 82 and other delivery lines or feeds. The flow of purge air through the liquid fuel delivery system may be substantially continuous while the combustor burns gaseous fuel for its necessary cooling effects.

The system of FIG. 5 includes an upstream valve 65 that controls the delivery of purge air to the outer channel 16 of the annular dual-flow check valve 10 and has an upstream valve 66 that controls the delivery of liquid fuel to the inner channel 18 of the annular dual-flow check valve 10. When the combustor 80 is burning liquid fuel, the valve 65 may remain closed such that no pressurized flow of purge air flows into the outer channel 16 such that the poppet 24 is displaced. The valve 66 may remain open such that liquid fuel flows through the inner channel 18 of the annular dual-flow check valve 10 so that it may be delivered to the combustor 80.

When the combustor 80 is switched so that it burns gaseous fuel, it will be appreciated that the flow of liquid fuel to the combustor 80 is halted. In this case, the valve 66 may be closed to prevent this flow. At the same time, the valve 65 may be opened such that pressurized purge air flows into the outer channel 16 of the annular dual-flow check valve 10. As described in more detail above, the pressure of the purge air may push against the annular poppet 24 and displace it in a downstream direction as the spring 22 compresses. This will allow the purge air to flow into the slots 44 and, thereby, reach the inner channel 18 where the purge air may continue downstream to the combustor 80 where it may complete its function of purging and cooling the fuel nozzles 86 of the combustor 80. It will be appreciated that through a section of the fuel delivery assembly of FIG. 5, the purge air flows through the outer channel 16 and around the periphery of the inner channel 18 that holds stationary liquid fuel. In a preferred embodiment, the purge air is maintained at a suitable temperature that sufficiently moderates or neutralizes the elevated temperatures found near the combustor 80 and keeps the stationary liquid fuel at a temperature below which coking occurs. That is, the flow of purge air is used to cool the liquid fuel in the inner channel 18 such that coking is avoided. In some embodiments, the divider between the inner channel 18 and the outer channel 16, which generally is the inner body 12 and its extension upstream, may be configured such that heat may be efficiently transferred between the purge air in the outer channel and the liquid fuel in the inner channel. This many include constructing the inner body 12 with a material the conducts heat well.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. An assembly for delivering a supply of liquid fuel and a supply of purge air to a gas turbine engine, the assembly comprising:
   an annular dual-flow check valve for controlling the flow through concentric channels that have a common outlet, the annular dual-flow check valve comprising:
      an outer body and an inner body that define the concentric channels, which include an outer channel and an inner channel formed therein;
      a spring activated annular poppet that resides in the outer channel and has a range of motion in the axial direction; and
      an opening through the inner body that connects the outer channel to the inner channel;
      wherein the axial movement of the annular poppet is regulated by the pressure of the flow upstream of the annular poppet in the outer channel; and the axial range of motion of the annular poppet includes at least two axial positions: a closed position where the annular poppet substantially covers the opening and a open position where at least a portion of the opening is not covered by the annular poppet;
   a first valve that is located upstream of the annular dual-flow check valve and configured to control a flow of purge air entering the outer channel; and
   a second valve that is located upstream of the annular dual-flow check valve and configured to control a flow of liquid fuel entering the inner channel.

2. The assembly according to claim 1, wherein the inner body comprises a material such that heat may be efficiently transferred between the purge air in the outer channel and the liquid fuel in the inner channel.

3. The assembly according to claim 1, wherein the axial movement of the annular poppet is regulated by the extent to which the pressure of the flow upstream of the annular poppet in the outer channel depresses the spring by pushing on the annular poppet.

4. The assembly according to claim 1, wherein the spring and annular poppet are configured such that:
   when the level of pressure of the flow upstream of the annular poppet is below a first predetermine pressure level, the annular poppet resides in the closed position; and
   when the level of pressure of the flow upstream of the annular poppet is above a second predetermine pressure level, the annular poppet resides in the open position.

5. The assembly according to claim 1, wherein:
   the outer body forms a hollow chamber that is substantially cylindrical in shape, the inner wall of which forms the outer boundary of the outer channel;
   an upstream end of the outer body comprises connecting means; and
   the inner body forms a hollow chamber that is substantially cylindrical in shape, the outer wall of which forms the inner boundary of the outer channel and the inner wall of which forms the outer boundary of the inner channel.

6. The assembly according to claim 1, wherein the inner body comprises:
   an inlet to the inner channel, the inlet extending in the upstream direction a desired distance and terminating with a means for terminating;
   a flange that extends radially from the inner body to the inner wall of the outer body and includes one or more flange channels therethrough;
   a mid-body that includes the opening; and
   an outlet to the inner channel, the outlet extending in the downstream direction a desired distance and terminating with a means for connecting.

7. The assembly according to claim 1, wherein:
   the flange comprises a radially extension that engages the outer body such that the axial position of the inner body in relation to the outer body is fixed; and
   the one or more flange channels comprise passageways through the flange that allow flow through the outer channel to pass through the flange.

8. The annular dual-flow check valve according to claim 1, wherein:
   the opening comprises a plurality of slots, the slots comprising axially oriented elongated openings; and
   the slots extend through the inner body angled in the downstream direction such that the axis through each of the slots forms an angle of between 30° and 60° with the axis through the inner channel.

9. The assembly according to claim 8, wherein:
   the diameter of the outer surface of the inner body gradually narrows upstream of the slots;
   the slots reside in a section of the inner body that comprises a reduced diameter; and
   the diameter of the outer surface of the inner body gradually broadens downstream of the slots.

10. The assembly according to claim 1, wherein:
    the annular poppet comprises solid doughnut shaped piece that extends substantially between the inner surface of the outer body and the outer surface of the inner body; and
    annular poppet comprises one or more poppet grooves that are configured to engage one or more o-rings that, upon assembly, substantially seal the annular poppet against the neighboring surfaces of the outer body and the inner body.

11. The assembly according to claim 1, further comprising an end-cap, the end-cap comprising a radially oriented surface that is fixed within the outer body that upon which the spring may rest when assembled;
    wherein:
    the end-cap, the spring, and the annular poppet are configured within the outer body and around the inner body such that: a) when the spring is not compressed beyond a predetermined amount, the annular poppet resides in an axial position that covers the opening, thereby preventing flow from the outer channel to the inner channel through the opening and flow from the inner channel to the outer channel through the opening; and b) when the spring is compressed beyond the predetermined amount, the annular poppet resides in a position that is downstream of the opening such that at least some of the opening is not covered by the annular poppet, thereby allowing flow from the outer channel to the inner channel through the opening.

12. The assembly according to claim 1, further comprising:
    a drain that resides upstream of the end-cap, the drain comprising an aperture through the outer body that is configured to provide an outlet for fluids that may leak around the annular poppet during operation; and
    a check valve that is positioned between the second valve and the opening.

13. The assembly according to claim 1, wherein:
a drain that resides upstream of the end-cap, the drain comprising an aperture through the outer body that is configured to provide an outlet for fluids that may leak around the annular poppet during operation; and
a check valve that is positioned between the second valve and the opening.

14. A method of delivering a supply of liquid fuel and a supply of purge air to a common supply line of a combustor of a gas turbine engine that burns liquid fuel and gas fuel, the method comprising the steps of:
a) configuring a fuel delivery assembly that includes:
an annular dual-flow check valve for controlling the flow through concentric channels that have a common outlet, the annular dual-flow check valve comprising:
an outer body and an inner body that define the concentric channels, which include an outer channel and an inner channel formed therein;
a spring activated annular poppet that resides in the outer channel and has a range of motion in the axial direction; and
an opening through the inner body that connects the outer channel to the inner channel;
wherein the axial movement of the annular poppet is regulated by the pressure of the flow upstream of the annular poppet in the outer channel; and the axial range of motion of the annular poppet includes at least two axial positions: a closed position where the annular poppet substantially covers the opening and a open position where at least a portion of the opening is not covered by the annular poppet;
a first valve that is located upstream of the annular dual-flow check valve and configured to control a flow of purge air entering the outer channel; and
a second valve that is located upstream of the annular dual-flow check valve and configured to control a flow of liquid fuel entering the inner channel;
b) when the combustor is burning liquid fuel, setting the first valve to a closed position such that substantially no purge air flows to the outer channel and the annular poppet remains in the closed position, and setting the second valve to a open position such that liquid fuel flows through the inner channel of the annular dual-flow check valve and is delivered to the common supply line; and
c) when the combustor is burning gas fuel, setting the second valve to a closed position such that substantially no liquid fuel flows to the inner channel, and setting the first valve to an open position such that purge air flows to the outer channel, displaces the annular poppet to the open position, flows through the opening and is delivered to the common supply line.

15. The method according to claim 14, further comprising the step of maintaining the temperature below a desired limit such that the purge air moderates the coking effects that elevated temperatures found near the combustor has on liquid fuel when the gas turbine engine burns gas fuel.

16. The method according to claim 14, wherein the inner body comprises a material such that heat may be efficiently transferred between the purge air in the outer channel and the liquid fuel in the inner channel.

17. The method according to claim 14, wherein the axial movement of the annular poppet is regulated by the extent to which the pressure of the flow upstream of the annular poppet in the outer channel depresses the spring by pushing on the annular poppet.

18. The method according to claim 14, wherein the spring and annular poppet are configured such that:
when the level of pressure of the flow upstream of the annular poppet is below a first predetermine pressure level, the annular poppet resides in the closed position; and
when the level of pressure of the flow upstream of the annular poppet is above a second predetermine pressure level, the annular poppet resides in the open position.

19. The method according to claim 14, wherein:
the outer body forms a hollow chamber that is substantially cylindrical in shape, the inner wall of which forms the outer boundary of the outer channel;
an upstream end of the outer body comprises connecting means; and
the inner body forms a hollow chamber that is substantially cylindrical in shape, the outer wall of which forms the inner boundary of the outer channel and the inner wall of which forms the outer boundary of the inner channel.

20. The method according to claim 14, wherein the inner body comprises:
an inlet to the inner channel, the inlet extending in the upstream direction a desired distance and terminating with a means for terminating;
a flange that extends radially from the inner body to the inner wall of the outer body and includes one or more flange channels therethrough;
a mid-body that includes the opening; and
an outlet to the inner channel, the outlet extending in the downstream direction a desired distance and terminating with a means for connecting.

21. The method according to claim 14, wherein:
the flange comprises a radially extension that engages the outer body such that the axial position of the inner body in relation to the outer body is fixed; and
the one or more flange channels comprise passageways through the flange that allow flow through the outer channel to pass through the flange.

22. The method according to claim 14, wherein:
the opening comprises a plurality of slots, the slots comprising axially oriented elongated openings; and
the slots extend through the inner body angled in the downstream direction such that the axis through each of the slots forms an angle of between 30° and 60° with the axis through the inner channel.

23. The method according to claim 22, wherein:
the diameter of the outer surface of the inner body gradually narrows upstream of the slots;
the slots reside in a section of the inner body that comprises a reduced diameter; and
the diameter of the outer surface of the inner body gradually broadens downstream of the slots.

24. The method according to claim 14, wherein:
the annular poppet comprises solid doughnut shaped piece that extends substantially between the inner surface of the outer body and the outer surface of the inner body; and
annular poppet comprises one or more poppet grooves that are configured to engage one or more o-rings that, upon assembly, substantially seal the annular poppet against the neighboring surfaces of the outer body and the inner body.

25. The method according to claim 14, wherein:
an end-cap is fixed within the outer body upon which the spring may rest when assembled; and
the end-cap, the spring, and the annular poppet are configured within the outer body and around the inner body such that: a) when the spring is not compressed beyond a predetermined amount, the annular poppet resides in an axial position that covers the opening, thereby preventing flow from the outer channel to the inner channel through the opening and flow from the inner channel to the outer channel through the opening; and b) when the spring is compressed beyond the predetermined amount, the annular poppet resides in a position that is downstream of the opening such that at least some of the opening is not covered by the annular poppet, thereby allowing flow from the outer channel to the inner channel through the opening.

* * * * *